US008621608B2

(12) United States Patent
Dalcher (10) Patent No.: US 8,621,608 B2
(45) Date of Patent: Dec. 31, 2013

(54) SYSTEM, METHOD, AND COMPUTER PROGRAM PRODUCT FOR DYNAMICALLY ADJUSTING A LEVEL OF SECURITY APPLIED TO A SYSTEM

(75) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 963 days.

(21) Appl. No.: 12/111,851

(22) Filed: Apr. 29, 2008

(65) Prior Publication Data

US 2013/0276112 A1 Oct. 17, 2013

(51) Int. Cl.
*H04L 29/06* (2006.01)
*G06F 21/00* (2013.01)

(52) U.S. Cl.
USPC ............ 726/22; 726/23; 726/24; 726/25; 713/164; 713/165; 713/166; 713/187; 713/188; 709/217; 709/219; 709/224; 709/225; 709/229

(58) Field of Classification Search
USPC ............. 726/22–30; 713/164–167, 188, 189, 713/187; 709/223–229, 217–219
See application file for complete search history.

(56) References Cited

U.S. PATENT DOCUMENTS

| | | | |
|---|---|---|---|
| 5,974,549 A * | 10/1999 | Golan | 726/23 |
| 6,594,686 B1 | 7/2003 | Edwards et al. | 709/203 |
| 6,931,540 B1 | 8/2005 | Edwards et al. | 713/188 |
| 7,085,934 B1 | 8/2006 | Edwards | 713/200 |
| 7,188,367 B1 | 3/2007 | Edwards et al. | 726/24 |
| 7,624,447 B1 * | 11/2009 | Horowitz et al. | 726/23 |
| 7,895,656 B1 * | 2/2011 | Brock | 726/24 |
| 2003/0131256 A1 * | 7/2003 | Ackroyd | 713/201 |
| 2003/0149887 A1 * | 8/2003 | Yadav | 713/200 |
| 2003/0149888 A1 * | 8/2003 | Yadav | 713/200 |
| 2005/0182967 A1 * | 8/2005 | Phillips et al. | 713/201 |
| 2006/0143447 A1 * | 6/2006 | Vasishth et al. | 713/166 |
| 2007/0156696 A1 * | 7/2007 | Lim | 707/9 |
| 2007/0192863 A1 * | 8/2007 | Kapoor et al. | 726/23 |
| 2007/0240217 A1 * | 10/2007 | Tuvell et al. | 726/24 |
| 2008/0301796 A1 * | 12/2008 | Holostov et al. | 726/12 |

FOREIGN PATENT DOCUMENTS

| | | | | |
|---|---|---|---|---|
| GB | 2418503 A | 3/2006 | | G06F 21/00 |
| GB | 2432686 A | 5/2007 | | G06F 21/00 |
| GB | 2432687 A | 5/2007 | | G06F 21/00 |

OTHER PUBLICATIONS

PROMISing Steps Towards Computer Hygiene by Vlachos et al; Publisher: International Network Conference; Year: 2006.*
U.S. Appl. No. 10/876,522, filed Jun. 24, 2004.
U.S. Appl. No. 10/876,523, filed Jun. 24, 2004.
U.S. Appl. No. 10/876,524, filed Jun. 24, 2004.
U.S. Appl. No. 10/952,039, filed Sep. 27, 2004.
U.S. Appl. No. 11/855,083, filed Sep. 13, 2007.
U.S. Appl. No. 11/010,786, filed Dec. 13, 2004.
U.S. Appl. No. 11/010,993, filed Dec. 13, 2004.
U.S. Appl. No. 11/194,236, filed Aug. 1, 2005.

(Continued)

*Primary Examiner* — Madhuri Herzog
(74) *Attorney, Agent, or Firm* — Wong Cabello Lutsch Rutherford & Brucculeri, LLP (57) ABSTRACT

A system, method, and computer program product are provided for dynamically adjusting a level of security applied to a system. In use, predetermined activity that is at least potentially associated with unwanted activity is identified on a system. Further, a level of security applied to the system is dynamically adjusted, in response to the identification of the predetermined activity.

21 Claims, 5 Drawing Sheets

(56) References Cited

OTHER PUBLICATIONS

U.S. Appl. No. 11/344,431, filed Jan. 30, 2006.
U.S. Appl. No. 11/776,485, filed Jul. 11, 2007.
U.S. Appl. No. 11/949,609, filed Dec. 3, 2007.
U.S. Appl. No. 12/046,143, filed Mar. 11, 2008.
U.S. Appl. No. 11/390,388, filed Mar. 28, 2006.

* cited by examiner

SYSTEM, METHOD, AND COMPUTER PROGRAM PRODUCT FOR DYNAMICALLY ADJUSTING A LEVEL OF SECURITY APPLIED TO A SYSTEM

FIELD OF THE INVENTION

The present invention relates to security systems, and more particularly to the application of security systems.

BACKGROUND

Traditionally, security systems have been utilized for securing devices from unwanted activity (e.g. malware, etc.). Oftentimes, such security systems have provided security from unwanted activity by performing monitoring and scanning operations. However, traditional security systems have generally exhibited various limitations. Just by way of example, a level of security applied by traditional security systems has conventionally been static, thus resulting in unnecessary resource consumption when the level of security is higher than that necessary to detect unwanted activity and further resulting in insufficient security when the level of security is lower than that necessary to detect the unwanted activity.

There is thus a need for addressing these and/or other issues associated with the prior art.

SUMMARY

A system, method, and computer program product are provided for dynamically adjusting a level of security applied to a system. In use, predetermined activity that is at least potentially associated with unwanted activity is identified on a system. Further, a level of security applied to the system is dynamically adjusted, in response to the identification of the predetermined activity.

DETAILED DESCRIPTION

Figure 1:
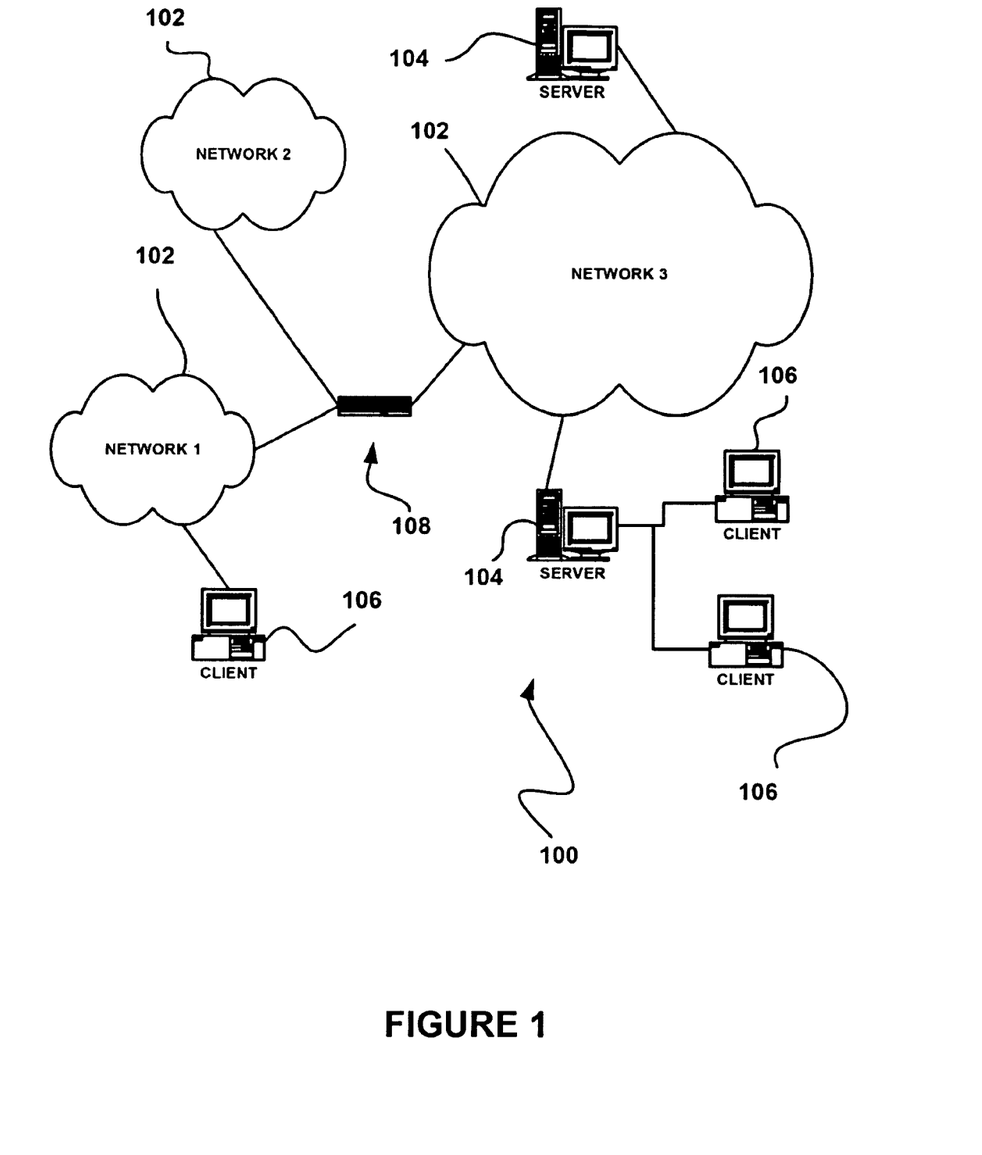
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
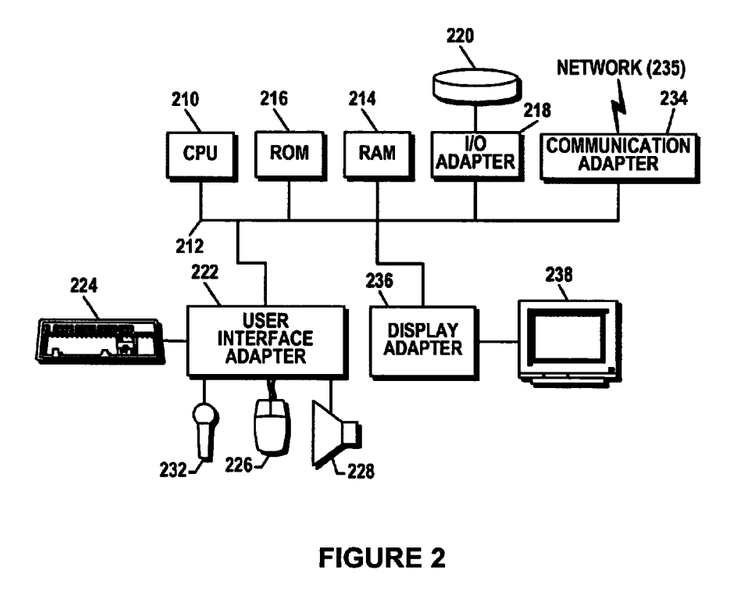
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
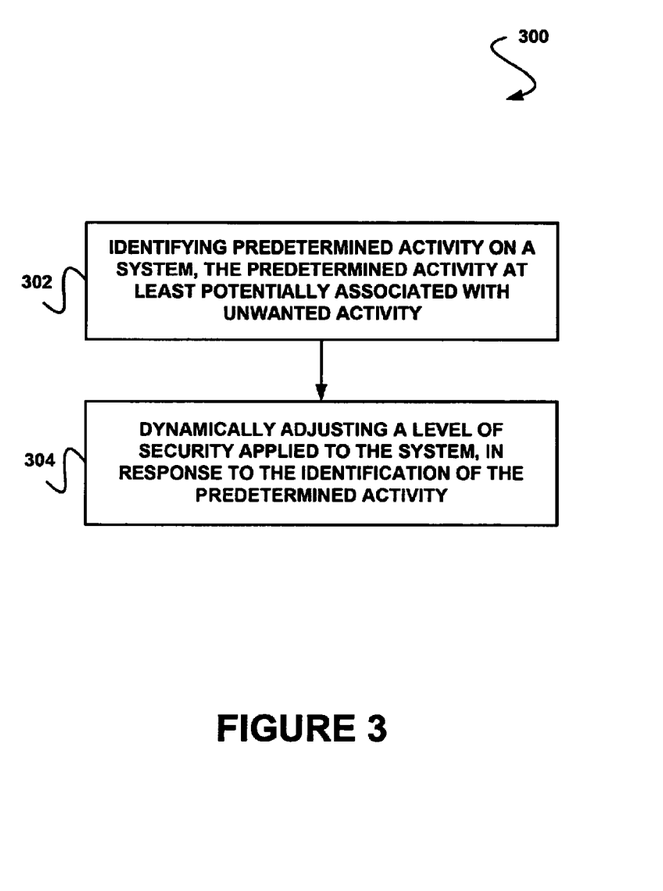
FIG. 3 illustrates a method for dynamically adjusting a level of security applied to a system, in accordance with one embodiment.

FIG. 3 illustrates a method 300 for dynamically adjusting a level of security applied to a system, in accordance with one embodiment. As an option, the method 300 may be carried out in the context of the architecture and environment of FIGS. 1 and/or 2. Of course, however, the method 300 may be carried out in any desired environment.

As shown in operation 302, predetermined activity that is at least potentially associated with unwanted activity is identified on a system. With respect to the present description, the system may include any device (e.g. computer, etc.), operating system, etc. on which predetermined activity that is at least potentially associated with unwanted activity may be identified. For example, the system may include any of the devices described above with respect to FIGS. 1 and/or 2.

Additionally, the predetermined activity may include any activity capable of being identified on the system that is predetermined and that is at least potentially associated with unwanted activity. In one embodiment, the activity may be predetermined by a user. For example, the activity may be included in a list of various different types of predetermined activity.

In another embodiment, the activity may be predetermined automatically. Just by way of example, the activity may be included in the list of various different types of predetermined activity in response to a previous determination that such activity is at least potentially associated with unwanted activity. As an option, the activity may be predetermined to be at least potentially associated with the unwanted activity. Of course, however, the activity may be predetermined in any manner.

Further, the predetermined activity may be capable of being utilized by the unwanted activity, such that the predetermined activity is at least potentially associated with the unwanted activity. As another example, the predetermined activity may be predetermined (e.g. based on a history of occurrences of the predetermined activity, etc.) to increase a vulnerability of the system to the unwanted activity. As yet another example, the predetermined activity may include activity capable of allowing the unwanted activity to be detected (e.g. self-extracting activity, etc.). It should be noted that the unwanted activity may include malware activity and/or any other activity that is unwanted.

In one embodiment, the predetermined activity may include a process connecting to an external network (e.g. the Internet, etc.). In another embodiment, the predetermined activity may include loading an executable, such as an application, dynamic link library (DLL), web browser plug-in, etc. For example, the executable may be excluded from a predefined list of known good (e.g. non-malicious) executables (e.g. executables predetermined to be associated with wanted activity), such as a whitelist of executables.

Of course, as another option, the predetermined activity may include any type of loading [e.g. loading instructions into a central processing unit (CPU), etc.]. Just by way of example, the predetermined activity may include loading a process within an executable (e.g. an executable excluded from the whitelist, etc.). As another example, the predetermined activity may include loading a process from an untrusted source (e.g. a source excluded from a predefined list of trusted sources, etc.).

In yet another embodiment, the predetermined activity may include accessing a website excluded from a predefined list of known good (e.g. non-malicious) websites (e.g. websites predetermined to be associated with non-malicious activity), such as a whitelist of websites. In still yet another embodiment, the predetermined activity may include activity performed utilizing such a website. For example, the activity may include downloading content from the website, loading content from the website, etc.

In a further embodiment, the predetermined activity may include activity of a process that is not included in predetermined activity for the process. The predetermined activity for the process may include types of activity predetermined to be allowed for the process, predetermined to be historically utilized by the process, etc. Thus, the predetermined activity may optionally include elevation of privileges (e.g. system access privileges, etc.) by a process, for example, if the elevation of the privileges is predetermined to be not allowed or historically utilized by the process.

Moreover, the predetermined activity may be identified utilizing monitoring of activity on the system. As an option, the monitoring may include a base level (e.g. default level, etc.) of monitoring. For example, the base level monitoring may include monitoring for predefined types of activity that include the predetermined activity identified in operation 302.

In one embodiment, the monitoring may include monitoring input and output (I/O) operations of the system utilizing filter drivers. Accordingly, the monitoring may utilize I/O filter drivers. The filter drivers may include file system filter drivers, just by way of example.

In another embodiment, the monitoring may be performed by implementing host environment callback functions. The host environment may include any environment capable of performing the monitoring. As an option, the host environment may include a web browser, an operating system, etc. For example, event callback functions may be implemented by an operating system for allowing the monitoring (e.g. of registry activity, etc.).

In yet another embodiment, the monitoring may be performed by redirecting an interface [e.g. application program interface (API), etc.] invocation to a monitoring callback function utilizing a hook. The interface may optionally be redirected utilizing an inline hook. As another option, the interface may be redirected by redirecting a pointer to the interface.

As also shown, a level of security applied to the system is dynamically adjusted, in response to the identification of the predetermined activity. Note operation 304. The security applied to the system may include the monitoring of the system, scanning of the system (e.g. scanning at least a portion of data associated with the predetermined activity for the unwanted data, etc.), an analysis performed with respect to the system, and/or any other processes capable of being applied to the system for securing the system (e.g. from unwanted activity, etc.). To this end, the level of security may optionally include a degree of security capable of being applied to the system for securing the system.

As an option, the security may be applied to the system with respect to any level of granularity associated with the system. For example, the security may be applied with respect to predetermined processes, threads and/or activity initiated by code executing from a particular portion of memory of the system. Further, the level of security may be dynamically adjusted in any desired manner.

In one embodiment, the level of security applied to the system may be dynamically adjusted by increasing the level of security. For example, the level of security may be increased by performing additional monitoring of the system (e.g. beyond the base level monitoring performed to identify the predetermined activity in operation 302). As an option, the additional monitoring may include monitoring for additional types of predetermined activity not monitored by the base level monitoring.

As another example, the level of security may be increased by performing additional monitoring of the predetermined activity (e.g. beyond the base level monitoring performed to identify the predetermined activity in operation 302). As an option, the additional monitoring may include monitoring for additional types of accesses performed by the identified predetermined activity that are not otherwise monitored by the base level monitoring. Such accesses may include creating opening, writing to, deleting, etc. files, in various embodiments.

As yet another example, the level of security may be increased by expanding the scanning performed on the system. The scanning may include searching data stored on the system for patterns that match previously identified patterns of unwanted data (e.g. malware patterns, etc.). The previously identified patterns of unwanted data may be stored in a database, as an option. For example, data stored on the system may be scanned utilizing signatures of unwanted data for determining whether such data is unwanted.

In one embodiment, the scanning may be expanded with respect to a base level of scanning implemented during the identification of the predetermined activity in operation 302. As an option, the base level of scanning may be capable of scanning a first subset of file operations for unwanted data, whereas the expanded scanning may be capable of scanning a second subset of file operations that includes more file operations than then first subset. As another option, the expanded scanning may be capable of scanning more portions of memory of the system than that capable of being scanned by the base level scanning.

In yet another embodiment, the level of security applied to the system may be dynamically adjusted by decreasing the level of security. For example, the level of security may be decreased by performing less monitoring of the system (e.g. less than the base level monitoring performed to identify the predetermined activity in operation 302). As an option, the lessened monitoring may include monitoring for fewer types of predetermined activity than that monitored by the base level monitoring.

As another example, the level of security may be decreased by performing less monitoring of the predetermined activity (e.g. less than the base level monitoring performed to identify the predetermined activity in operation 302). As an option, the lessened monitoring may include monitoring for fewer types of accesses performed by the identified predetermined activity than that monitored by the base level monitoring.

As yet another example, the level of security may be decreased by reducing the scanning performed on the system. In one embodiment, the scanning may be reduced with respect to a base level of scanning implemented during the identification of the predetermined activity in operation 302. As an option, the base level of scanning may be capable of scanning a first subset of file operations for unwanted data, whereas the reduced scanning may be capable of scanning only a fraction of the first subset of file operations. As another option, the reduced scanning may be capable of scanning fewer portions of memory of the system than that capable of being scanned by the base level scanning.

To this end, the level of security applied to the system may be dynamically adjusted in response to identification on the system of predetermined activity that at least potentially includes unwanted activity. Such dynamically adjusted security may be utilized to reduce system resource consumption resulting from unwanted activity detection processes when predetermined activity potentially associated with the unwanted activity is not identified. Similarly, the dynamically adjusted security may be utilized to increase a level of unwanted activity detection utilized when predetermined activity potentially associated with the unwanted activity is identified, such that the unwanted activity may be prevented from evading detection that may otherwise occur due to the application of lower level security.

It should be noted that as another option, the level of security applied to the system may be dynamically adjusted in response to identification of the predetermined activity and a history of predetermined activity identified on the system. The identification of the predetermined activity and the history of predetermined activity may be evaluated for determining a behavior of the system, such that the level of security may be dynamically adjusted based on the behavior of the system.

For example, if the latest identification of the predetermined activity and the history of predetermined activity exceeds a maximum threshold, the level of security may be increased. Similarly, if the latest identification of the predetermined activity and the history of predetermined activity is lower than a minimum threshold, the level of security may be decreased.

In one exemplary embodiment, the system may be monitored at a base level for various types of predetermined activity. One of such types of predetermined activity may include execution of a packer, for example. The packer may include a self-extracting payload capable of being utilized by malware to extract or decrypt portions of the malware from the payload such that the extracted or decrypted malware portions may be executed.

Thus, based on the monitoring at the base level, activity including extraction or decryption of a payload may be identified. In response to the identification of such activity, a level of security applied to the system on which the activity was identified may be dynamically adjusted. For example, the level of security may be dynamically increased to a level of security higher than a base level of scanning enabled during identification the activity.

As an option, the increased level of security may include performing scanning of data associated with the packer (e.g. the extracted data, etc.) for determining whether the data is unwanted. In this way, malware that is exposed to detection by being extracted from a payload may be detected utilizing the increased level of security.

In another exemplary embodiment, a data leakage prevention system may perform the base level of monitoring for identifying an open operation of files that include confidential data, personally identifiable information (e.g. social security number, etc.), etc. In response to identification of the open operation associated with such a file, a level of security (e.g. monitoring and scanning) applied to the process utilized to perform the open operation may be dynamically increased.

In yet another exemplary embodiment, the level of security may be adjusted with respect to forensics. For example, the system may utilize such forensics for establishing various facts. Thus, the system may optionally utilize forensics to identify predetermined activity that is at least potentially associated with unwanted activity on the system, and may further dynamically adjust a level of security applied to the system based on the identification of the predetermined activity.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
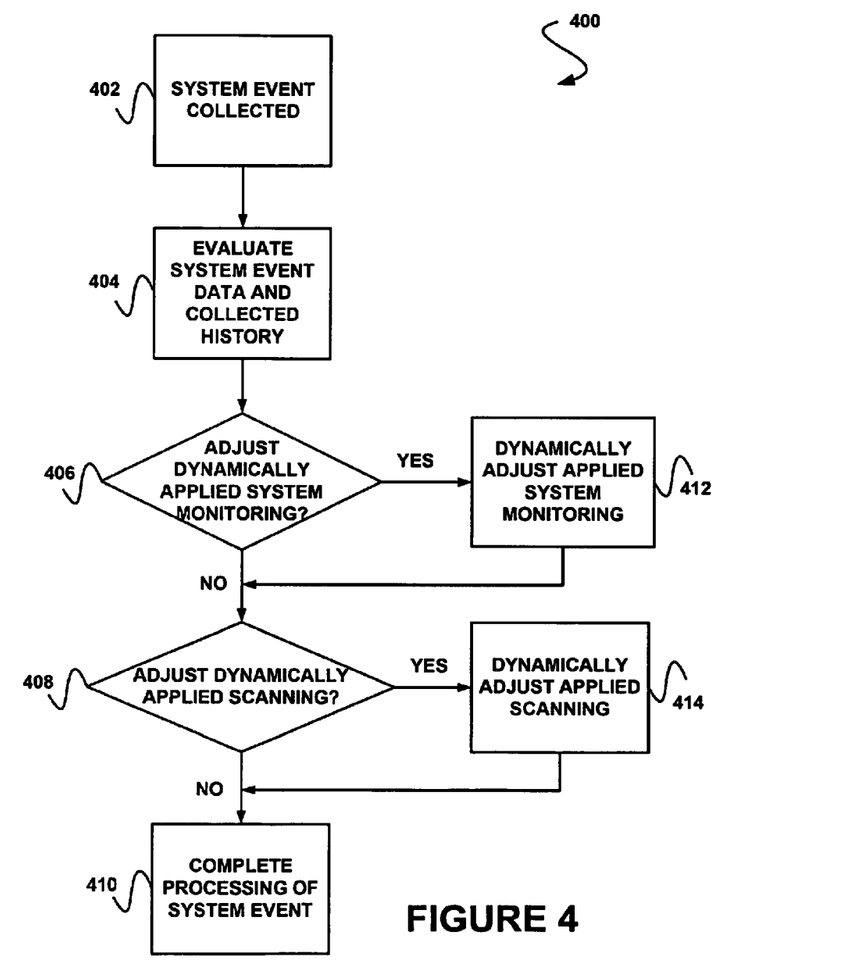
FIG. 4 illustrates a method for processing a system event utilizing a dynamically adjusted level of security, in accordance with another embodiment.

FIG. 4 illustrates a method 400 for processing a system event utilizing a dynamically adjusted level of security, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a system event is collected. In the context of the present embodiment, the system event may include any predetermined activity on a system that is at least potentially associated with unwanted activity. For example, system event may be collected in response to a determination that the system event is a predetermined type of system event.

As an option, collecting the system event may include identifying the system event. As another option, collecting the system event may include logging the system event in a history of collected system events. As yet another option, the system event may be collected utilizing a base level monitoring for such system event.

Additionally, the system event and a collected history are evaluated, as shown in operation 404. In one embodiment, the collected history may include the history of collected system events noted above. For example, the collected history may include a history of system events that are each a predetermined type of system event.

In another embodiment, the system event and collected history may be evaluated according to a predefined policy. Just by way of example, the system event and collected history may be compared to at least one rule included in the predefined policy. In yet another embodiment, the system event and collected history may be evaluated utilizing a behavioral analysis.

Further, as shown in decision 406, it is determined whether applied system monitoring is to be dynamically adjusted. The applied system monitoring may include the base level monitoring utilized to collect the system event (in operation 402). Of course, however, the applied system monitoring may include any monitoring enabled on the system.

As an option, the determination may be based on the evaluation of the system event and collected history. For example, the determination may be based on whether the policy has been violated by the system event and collected history. Thus, in one embodiment, it may be determined that the applied system monitoring is to be dynamically adjusted if the policy (e.g. rule of the policy) has been violated by the system event and collected history.

If it is determined that the applied system monitoring is to be dynamically adjusted, the applied system monitoring is dynamically adjusted. Note operation 412. The adjustment of the applied system monitoring may include dynamically increasing or decreasing a level of the applied system monitoring, in various embodiments. Moreover, the policy may optionally indicate whether the level of the applied system monitoring is to be dynamically increased or decreased.

In response to the dynamic adjustment of the applied system monitoring (operation 412) or if it is determined that the applied system monitoring is not to be dynamically adjusted (decision 406), it is further determined whether applied scanning is to be dynamically adjusted. Note decision 408. The applied scanning may include a base level of scanning applied to the system during the collection of the system event (in operation 402). Of course, however, the applied scanning may include any scanning enabled on the system. Such scanning may be utilized for scanning data on the system for unwanted data, in one embodiment.

As an option, the determination of whether the applied scanning is to be dynamically adjusted may be based on the policy. For example, the determination may be based on whether the policy has been violated by the system event and collected history. Thus, in one embodiment, it may be determined that the applied scanning is to be dynamically adjusted if the policy (e.g. rule of the policy) has been violated by the system event and collected history. As another option, the determination of whether the applied scanning is to be dynamically adjusted may be based on the type of the system event collected (e.g. according to predefined rules, etc.).

If it is determined that the applied scanning is to be dynamically adjusted, the applied scanning is dynamically adjusted. Note operation 414. The adjustment of the applied scanning may include dynamically increasing or decreasing a level of the applied scanning, in various embodiments. Moreover, the policy may optionally indicate whether the level of the applied scanning is to be dynamically increased or decreased.

In response to the dynamic adjustment of the applied scanning (operation 414), or if it is determined that the applied scanning is not to be dynamically adjusted (decision 408), processing of the system event is completed. Note operation 410. In one embodiment, processing of the system event may include further monitoring of the system event. In this way, the system event may be monitored at the dynamically adjusted level of system monitoring if it is determined in decision 406 that the applied system monitoring is to be dynamically adjusted.

In another embodiment, processing of the system event may include scanning the system event. For example, the system event may be scanned for unwanted data. Thus, as an option, the system event may be scanned at the dynamically adjusted level of scanning if it is determined in decision 408 that the applied scanning is to be dynamically adjusted.

As an option, if the applied system monitoring and/or the applied scanning are dynamically adjusted in response to the collection of the system event, the dynamically adjusted system monitoring and/or applied scanning may be dynamically readjusted in response to completion of the processing of the system event. For example, the applied system monitoring and/or the applied scanning may be readjusted to the level (e.g. base level) that was previously applied to the system when the system event was collected (in operation 402). Of course, however, the applied system monitoring and/or the applied scanning may be readjusted at any time, such as based on the collection of additional system events.

Figure 5:
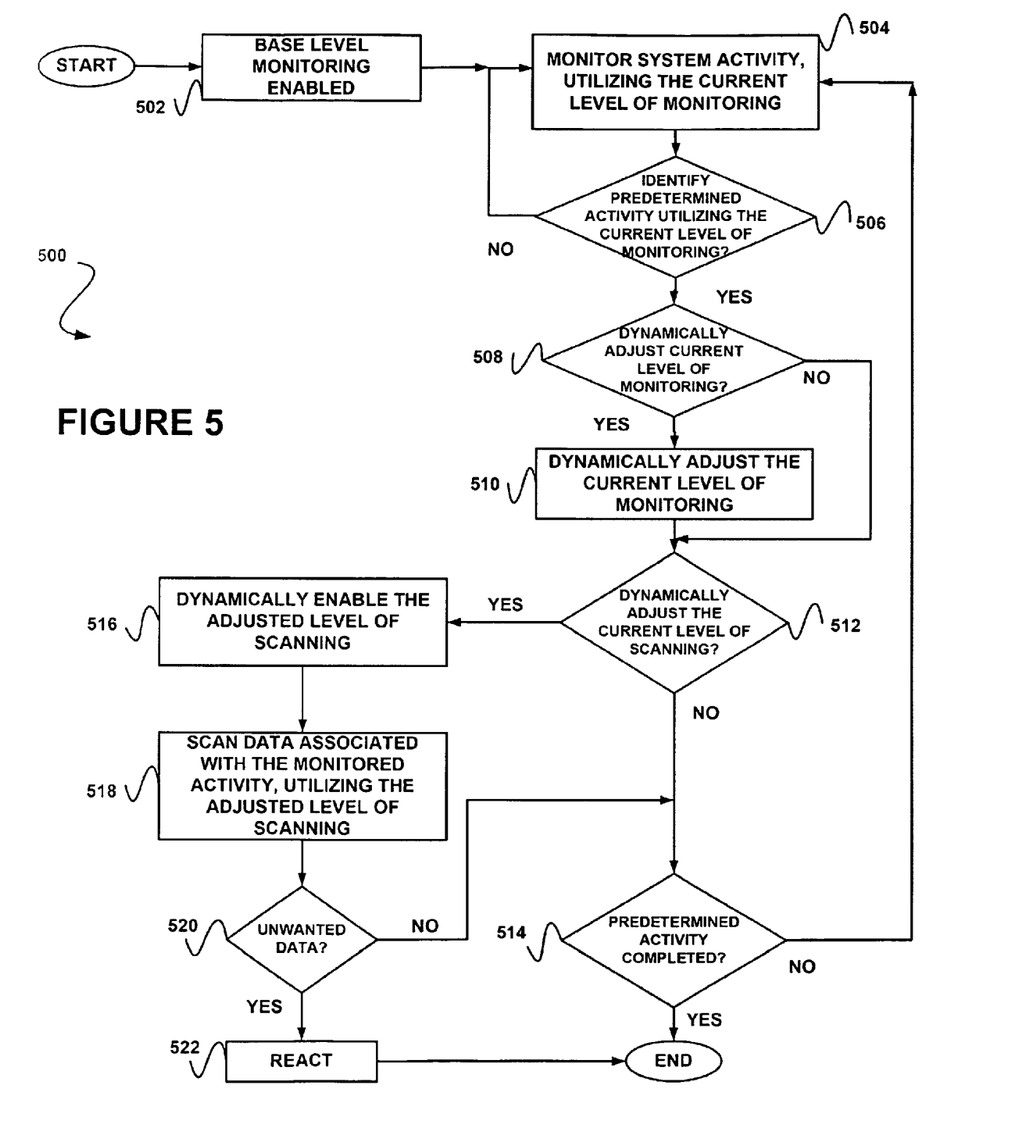
FIG. 5 illustrates a method for detecting unwanted data utilizing a dynamically adjusted level of security, in accordance with yet another embodiment.

FIG. 5 illustrates a method 500 for detecting unwanted data utilizing a dynamically adjusted level of security, in accordance with yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown in operation 502, a base level of monitoring is enabled. The base level of monitoring may include a default level of monitoring (e.g. preconfigured by a user, etc.). As an option, the base level of monitoring may be enabled for a system upon startup of the system.

In addition, system activity is monitored utilizing the current level of monitoring, as shown in operation 504. The current level of monitoring may include the enabled level of monitoring. Thus, in response to enablement of the base level of monitoring in operation 502, the system activity may be monitored utilizing such base level of monitoring. The system activity may be monitored for identifying predetermined activity on the system, with respect to the present embodiment.

Further, as shown in decision 506, it is determined whether the predetermined activity is identified utilizing the current level of monitoring. If it is determined that the predetermined activity is not identified utilizing the current level of monitoring, system activity continues to be monitored utilizing the current level of monitoring (operation 504). In this way, system monitoring may be continuously performed for identifying predetermined activity on the system.

If, however, it is determined that the predetermined activity is identified utilizing the current level of monitoring, it is further determined whether the current level of monitoring is to be dynamically adjusted. Note decision 508. In one embodiment, the determination may be based on a policy. For example, the policy may indicate the level of monitoring to be enabled in response to identification of the particular type of predetermined activity identified in decision 506.

If it is determined that the current level of monitoring is to be dynamically adjusted, the current level of monitoring is dynamically adjusted, as shown in operation 510. In various embodiments, the current level of monitoring may be adjusted by being increased or decreased (e.g. based on the policy, etc.). As an option, the adjusted current level of monitoring may only be used for monitoring the identified predetermined activity, such that the previous level of monitoring (e.g. the base level) may be utilized for monitoring remaining system activity. Of course, as another option, the adjusted current level of monitoring may be used for monitoring all system activity.

In response to the dynamic adjustment of the current level of monitoring (operation 510), or if is determined that the current level of monitoring is not to be dynamically adjusted (decision 508), it is further determined whether the current level of scanning is to be dynamically adjusted. Note decision 512. The current level of scanning may include a level of scanning enabled on the system. In one embodiment, the determination may be based on the policy. For example, the policy may indicate the level of scanning to be enabled in response to identification of the particular type of predetermined activity identified in decision 506.

If it is determined that the current level of scanning is not to be dynamically adjusted, it is determined whether the predetermined activity has completed, as shown in decision 514. If it is determined that the predetermined activity has not completed, system activity continues to be monitored utilizing the current level of monitoring (operation 504). In this way, the predetermined activity may continue to be monitored at the current level of monitoring until completion of such predetermined activity. As an option, in response to a determination that the predetermined activity has completed, the level of monitoring may be readjusted to the base level of monitoring.

If it is determined that the current level of scanning is to be dynamically adjusted, an adjusted level of scanning is dynamically enabled. Note operation 516. In various embodiments, the current level of scanning may be adjusted by being increased or decreased (e.g. based on the policy, etc.). For example, the current level of scanning may be adjusted such that fewer or additional scanning operations are enabled.

Still yet, as shown in operation 518, data associated with the monitored activity is scanned utilizing the adjusted level of scanning. In one embodiment, the data associated with the monitored activity may include all data (e.g. code, files, etc.) utilized by, accessed by, the source for, etc. all activity monitored on the system subsequent to the adjustment to the level of scanning. In another embodiment, the data associated with the monitored activity may include only the data associated with the predetermined activity identified (in decision 506).

Further, the data associated with the monitored activity may be scanned for unwanted data. For example, such data may be scanned for malware. To this end, it is determined whether the data associated with the monitored activity includes unwanted data. Note decision 520.

If it is determined that the data associated with the monitored activity does not include unwanted activity, it is determined whether the predetermined activity has completed (decision 514), as described above. If, however, it is determined that the data associated with the monitored activity includes unwanted data, a reaction is performed, as shown in operation 522. The reaction may include any reaction to the unwanted activity. Just by way of example, the reaction may include blocking the activity associated with the data, quarantining the data, reporting the unwanted data, logging the unwanted data, etc. In this way, unwanted data may be detected utilizing the dynamically adjusted level of monitoring and/or scanning.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising instructions stored thereon to cause one or more processors to:
   determine, by a device, an absence of a first activity that was previously identified on the device, wherein the first activity is predetermined to be associated with an increased vulnerability of the device to unwanted data, and wherein the absence is determined utilizing a first level of monitoring of the device;
   dynamically adjust to a second level of monitoring of the device in response to the determination of the absence of the first activity, wherein the second level of monitoring of the device comprises monitoring for one or more fewer types of accesses performed by the first activity, the one or more fewer types of accesses representing a subset of types of accesses being monitored utilizing the first level of monitoring; and
   dynamically adjust from a first level of scanning to a second level of scanning in response to the identification of the first activity, wherein the first level of scanning comprises scanning a first subset of a memory local to the device for the unwanted data and the second level of scanning comprises scanning a second subset of the memory local to the device for the unwanted data.

2. The non-transitory computer readable medium of claim 1, wherein the unwanted data comprises malware.

3. The non-transitory computer readable medium of claim 1, further comprising instructions to cause one or more processors to:
   identify a suspect activity on the device that is predetermined to be associated with an increased vulnerability of the device to unwanted data, the suspect activity identified utilizing the second level of monitoring;
   dynamically adjust to a third level of monitoring of the device in response to the identification of the suspect activity, wherein the third level of monitoring of the device comprises monitoring for one or more additional types of accesses performed by the suspect activity;
   determine an absence of the suspect activity on the device, wherein the absence is determined utilizing the third level of monitoring of the device; and
   dynamically adjust to the second level of monitoring of the device in response to the determination of the absence of the suspect activity.

4. The non-transitory computer readable medium of claim 3, wherein the instructions to cause the one or more processors to identify the suspect activity comprise instructions to cause the one or more processors to identify a process connecting to an external network.

5. The non-transitory computer readable medium of claim 3, wherein the instructions to cause the one or more processors to identify the suspect activity comprise instructions to cause the one or more processors to identify a loading of an executable excluded from a predefined list of known non-malicious executables.

6. The non-transitory computer readable medium of claim 3, wherein the instructions to cause the one or more processors to identify the suspect activity comprise instructions to cause the one or more processors to identify an attempt to access a website excluded from a predefined list of known non-malicious websites.

7. The non-transitory computer readable medium of claim 3, wherein the instructions to cause the one or more processors to identify the suspect activity comprise instructions to cause the one or more processors to identify a change of privileges by a process.

8. The non-transitory computer readable medium of claim 1, wherein the instructions to cause the one or more processors to utilize at least one of the first level of monitoring and the second level of monitoring comprise instructions to cause the one or more processors to monitor input and output operations of the device utilizing filter drivers.

9. The non-transitory computer readable medium of claim 1, wherein the instructions to cause the one or more processors to utilize at least one of the first level of monitoring and the second level of monitoring comprise instructions to cause the one or more processors to implement host environment callbacks functions.

10. The non-transitory computer readable medium of claim 1, wherein the instructions to cause the one or more processors to utilize at least one of the first level of monitoring and the second level of monitoring comprise instructions to cause the one or more processors to redirect an interface invocation to a monitoring callback function utilizing a hook.

11. The non-transitory computer readable medium of claim 3, wherein the instructions to cause the one or more processors to utilize the second level of scanning comprise instructions to cause the one or more processors to scan at least a portion of data associated with the suspect activity for the unwanted data.

12. The non-transitory computer readable medium of claim 1, wherein the instructions to cause the one or more processors to dynamically adjust to the second level of monitoring comprise instructions to cause the one or more processors to adjust to the second level of monitoring based on a behavioral analysis of the first activity and a history of collected events of a predetermined type.

13. The non-transitory computer readable medium of claim 1, wherein the instructions to cause the one or more processors to utilize the first level of monitoring comprise instructions to cause the one or more processors to utilize a base level of monitoring.

14. The non-transitory computer readable medium of claim 1, wherein the second subset of the memory is smaller than the first subset of the memory.

15. The non-transitory computer readable medium of claim 1, wherein the instructions to cause the one or more processors to utilize the first level of scanning and the second level of scanning comprise instructions to cause the one or more processors to scan for malware.

16. The non-transitory computer readable medium of claim 3, wherein the instructions to cause the one or more processors to identify the suspect activity comprise instructions to cause the one or more processors to identify a change of privileges by a process.

17. A method, comprising:
determining, with a processor of a device, an absence of a first activity that was previously identified on the device, wherein the first activity is predetermined to be associated with an increased vulnerability of the device to unwanted data, and wherein the absence is determined utilizing a first level of monitoring of the device;
dynamically adjusting, with the processor, to a second level of monitoring of the device in response to the determination of the absence of the first activity, wherein the second level of monitoring of the device comprises monitoring for one or more fewer types of accesses performed by the first activity, the one or more fewer types of accesses representing a subset of types of accesses being monitored utilizing the first level of monitoring; and
dynamically adjusting, with the processor, from a first level of scanning to a second level of scanning in response to the identification of the first activity, wherein the first level of scanning comprises scanning a first subset of a memory local to the device for the unwanted data and the second level of scanning comprises scanning a second subset of the memory local to the device for the unwanted data.

18. The method of claim 17, further comprising:
identifying a suspect activity on the device that is predetermined to be associated with an increased vulnerability of the device to unwanted data, the suspect activity identified utilizing the second level of monitoring;
dynamically adjusting to a third level of monitoring of the device in response to the identification of the suspect activity, wherein the third level of monitoring of the device comprises monitoring for one or more additional types of accesses performed by the suspect activity;
determining an absence of the suspect activity on the device, wherein the absence is determined utilizing the third level of monitoring of the device; and
dynamically adjusting to the second level of monitoring of the device in response to the determination of the absence of the suspect activity.

19. The method of claim 18, wherein the act of identifying the suspect activity that is predetermined to be associated with an increased vulnerability of the device to unwanted data comprises the act of identifying a process connecting to an external network.

20. A system, comprising:
a memory;
a network connection communicatively coupled to the memory and configured to receive data from a network;
a user interface adapter communicatively coupled to the memory and configured to receive input from a user; and
a processing device operatively communicatively coupled to the memory, the network connection and the user interface adapter, the processing device adapted to execute program code stored in the memory to:
determine an absence of a first activity that was previously identified on the system, wherein the first activity is predetermined to be associated with an increased vulnerability of the device to unwanted data, and wherein the absence is determined utilizing a first level of monitoring of the system;
dynamically adjust to a second level of monitoring of the system in response to the determination of the absence of the first activity, wherein the second level of monitoring of the system comprises monitoring for one or more fewer types of accesses performed by the first activity, the one or more fewer types of accesses representing a subset of types of accesses being monitored utilizing the first level of monitoring; and
dynamically adjust from a first level of scanning to a second level of scanning in response to the identification of the first activity, wherein the first level of scanning comprises scanning a first subset of the memory for the unwanted data and the second level of scanning comprises scanning a second subset of the memory for the unwanted data.

21. The system of claim 20, wherein the second subset of the memory is smaller than the first subset of the memory.

* * * * *

UNITED STATES PATENT AND TRADEMARK OFFICE
CERTIFICATE OF CORRECTION

PATENT NO. : 8,621,608 B2
APPLICATION NO. : 12/111851
DATED : December 31, 2013
INVENTOR(S) : Gregory William Dalcher Page 1 of 1

It is certified that error appears in the above-identified patent and that said Letters Patent is hereby corrected as shown below:

In the Claims:

In column 11, line 15, in claim 9, replace "callbacks" with --callback--.

Signed and Sealed this
Fifteenth Day of April, 2014

Michelle K. Lee
*Deputy Director of the United States Patent and Trademark Office*